Feb. 22, 1944.    G. LISI    2,342,287
CONTROL DEVICE FOR VARYING THE SPEED OF PARACHUTES DURING THE DESCENT
Filed Sept. 16, 1940

Inventor
Giuseppe Lisi
by *[signature]*
Attorney.

Patented Feb. 22, 1944

2,342,287

UNITED STATES PATENT OFFICE 2,342,287

CONTROL DEVICE FOR VARYING THE SPEED OF PARACHUTES DURING THE DESCENT

Giuseppe Lisi, Rome, Italy; vested in the Alien Property Custodian

Application September 16, 1940, Serial No. 357,045
In Italy June 6, 1940

1 Claim. (Cl. 244—152)

The present invention relates to a device for varying the speed of parachutes during the descent.

According to the present invention a parachute, besides having the normal surface and usual rope system, which starting from the periphery of the chute surface (preferably in correspondence to the cords or meridian seams) is united down below to a suspension member (generally a ring) to which the load is appended, is provided with a second system of ropes starting from a circular line lying in a plane parallel to the periphery of the chute surface and lying furthermore on the canopy of the parachute, said ropes being connected down below to a second traction and suspension member, which by means of a convenient device may be at will approached to or removed from the first suspension member already mentioned, so that the surface of the parachute may be reduced or increased, the speed of descent varying consequently at will.

The device approaching to or removing from one another the two suspension members mentioned of the two rope systems comprises preferably a rope, which starting from the suspension member of the outside rope system (connected with the peripheric parallel of the parachute) passes through a pulley or in a ring of the suspension member of the inside rope system (connected with the minor parallel limiting the inner canopy of the parachute) and returns downwards in such a position as to be reached by the hand of the parachutist. Preferably this control cord is provided with knots or similar catching means in correspondence with the free part on which the parachutist's hands have to operate with the object to facilitate the manoeuvre.

The descent speed regulating device, constituting a true, proper change speed gear for parachutes and being the subject matter of the present invention, may be applied to all parachutes of a known type and already constructed by means of simple adaptations, particularly by producing an advantage unforseen constituting another characteristic of the present invention. This unforeseen advantage lies in the fact that, when applying the control internal rope system, object of the present invention, to a normal parachute with a simple surface, already constructed, by exercising a light traction by means of the said control cord on the internal rope system, the result is obtained to reduce the normal descent speed of the parachute, while, when continuing the traction in a still greater proportion, the descent speed returns to the normal original value and consequently increases to a maximum value, when the parachute only functions with the inner canopy, while the portion of the surface comprised between the two suspension parallels of the internal and external rope system is completely bent upwards and the whole load is only applied to the internal rope system.

The change speed gear for parachutes, object of the present invention, may also be applied to special types of parachutes, for instance to the parachute with elastic rope system and shock absorbing skirt specified in the application 340,196 already filed in America, thus there being united the advantages of the elastic parachute for jumps from aircrafts flying at a very high speed and the advantages of the parachute with variable descent speed, with which, for instance a parachutist may jump from a remarkable height, perform a first section of slow descent, effect a rapid descent as far as nearly the ground and slowing down again to reach the ground with a minimum speed.

The change speed gear according to the present invention finds thus an important application for military services, when for instance a great number of parachutists may jump from a great height in the same zone, after which the single parachutist by regulating the descent speed may be united together at a great height and then jump at a high speed towards the ground, braking during the last part of the descent, then grounding at the same time and substantially on the same point.

The invention is illustrated in the accompanying drawing, in which.

Figure 1:
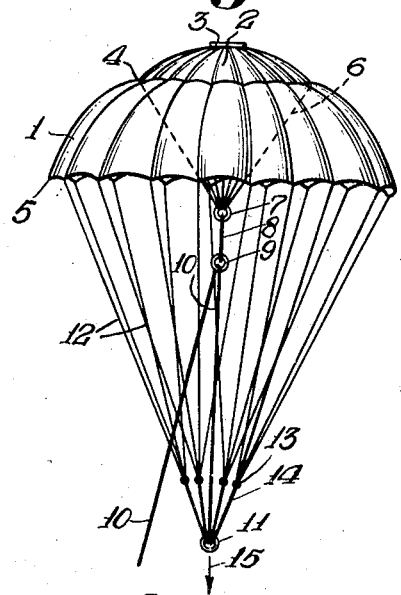
Fig. 1 shows a normal parachute provided with a change speed gear according to the present invention in the position of a slow descent.

With reference to Fig. 1 a normal parachute has the surface subdivided into two zones, that is a skirt 1 and an upper canopy or dome 2, provided with a normal hole 3 in the vertex, by a line 4 parallel to the peripheric line 5. The parallel 4 limits a dome 2, whose size is such as to allow, when excluded the braking action of the skirt 1, a very high descent speed. On the line 4 there is fixed an internal rope system 6 connected into a suspension and traction member, comprising, for instance, the ring 7, the inextensible rope 8 and the ring or pulley 9. A control rope 10 secured to the suspension member 11 of the external rope system 12 passes through the ring or pulley 9 and returns downwards so as to be reached by the hand of the man suspended in 15 to the suspension member 11.

The external rope system 12 in the present case is provided with connecting points 13 for rope groups 12, each of said points 13 is united to the member 11 by means of inextensible cords 14.

The device functions as follows: In the descent at a low speed, the cord 10 is slackened, the weight 15 gravitates only on the suspension member 11 and the whole surface of the skirt 1 and calotte 2 constitutes the active surface of the parachute. When an increase of speed is wanted, a traction is exercised on the free part of the cord 10, thus the suspension member 9 approaching the suspension member 11, consequently by distribution in a variable proportion the load 15 between the external rope system 12 and the internal rope system 6, which when little by little the members 9 and 11 are approaching to one another, bears a part always greater than the load 15 till this load is completely supported when the whole is trimmed in the position shown in Fig. 2, this constituting the high speed trim. Should a reduction of speed be wanted, it is sufficient to diminish the traction exercised with the hands on the cord 10 leaving more or less the skirt 1 to come into action.

As already remarked, when beginning the application of the traction on the rope 10, the parachute formed by the skirt 1 and the upper dome 2 being thus lightly deformed, the speed instead of increasing, decreases at the beginning and descends below the value assumed when the whole load 15 is supported by the external rope system 12.

Figure 2:
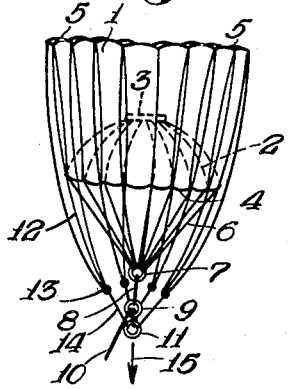
Fig. 2 shows the same parachute in the position of a rapid descent.
Figure 3:
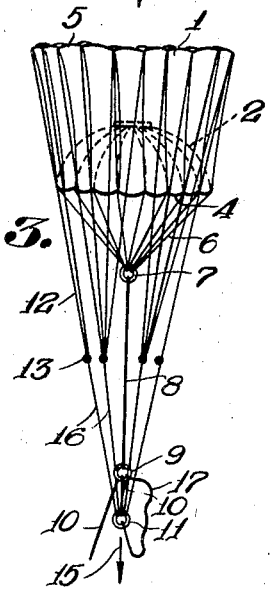
Fig. 3 shows a parachute with an elastic rope system and shock absorbing skirt, according to the application already mentioned 340,196 provided with the change speed device object of the present invention.

In Fig. 3, where the parts corresponding to those of Figures 1 and 2 are indicated with the same reference numbers, the inextensible cords 14 are replaced by rubber cords 16 making the suspension resilient and automatically regulated the speed; when the cord 10 is completely slackened and the suspension members 9 and 11 are connected by the inextensible rope 17 illustrated in Fig. 3. This type of parachute combines the advantages described in the application No. 340,196 already filed, and those according to the present invention.

Figure 4:
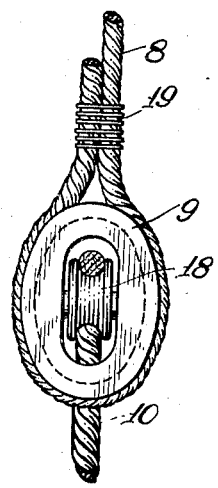
Fig. 4 shows a detail of the control device for approaching the suspension member of the internal rope system to the suspension member of the external rope system.

In Fig. 4 there is illustrated a particular form of realisation of the suspension member 9 of the internal rope system. The member 9 is substantially of an ovoidal form and through its external groove there passes the rope 8 bent on itself and fixed by a binding 19. Inside the ovoid 9 there is mounted a pulley 18 around which there passes the control cold 10. By conveniently choosing the dimensions and plays between the cord 10, pulley 18 and ovoid 9, a perfect functioning of the device is secured.

The present invention has been illustrated and described in a preferred form of realisation, but it is understood that constructive changes may be practically introduced therein without surpassing the limits of protection of the present industrial patent.

Having now particularly described and ascertained the nature of my said invention and in what manner the same is to be performed, I declare that what I claim is:

A parachute comprising a canopy, a skirt portion on said canopy, primary suspension cords extending from the outer periphery of said skirt portion, secondary suspension cords extending from the outer periphery of said canopy, a suspension member secured to said primary suspension cords, a block secured to said secondary suspension cords with securing means in the form of a cord attached to said secondary suspension cords and extending about the periphery of said block, a pulley mounted centrally upon a horizontal axis in said block, and a control rope secured to said suspension member and passing over said pulley, whereby the operator can transfer the weight carried by the suspension member from said primary suspension cords to said secondary suspension cords so that the entire weight may be supported by said canopy with the result that the rate of descent of the parachute is controlled.

GIUSEPPE LISI.